United States Patent [19]

Strong

[11] 4,318,691
[45] Mar. 9, 1982

[54] FURNACE FOR EXPANDING MINERAL ORES

[76] Inventor: William A. Strong, Rte. 11, Box 1150, Brinkley Rd., Pine Bluff, Ark. 71611

[21] Appl. No.: 196,135

[22] Filed: Oct. 10, 1980

[51] Int. Cl.³ .......................... F27B 15/00; F27D 1/08
[52] U.S. Cl. .................................. 432/58; 252/378 P; 432/102
[58] Field of Search ..................... 432/13, 58, 95, 102; 252/378, 378 P

[56] References Cited

U.S. PATENT DOCUMENTS

| | | | |
|---|---|---|---|
| 551,725 | 12/1895 | Greenwalt | 432/95 |
| 685,336 | 10/1901 | Leroy et al. | 432/102 |
| 2,536,742 | 1/1951 | Hammond | 432/58 |
| 2,572,484 | 10/1951 | Howle et al. | 432/58 |
| 3,097,832 | 7/1963 | Murdock et al. | 432/58 |

*Primary Examiner*—John J. Camby

*Attorney, Agent, or Firm*—Stephen D. Carver

[57] ABSTRACT

A high temperature furnace adapted to expand mineral ores such as vermiculite, perlite and the like. The furnace preferably includes an upright, vertically oriented frame adapted to support an elongated furnace tube into which mineral ore is delivered for expansion. Raw ore may be routed through a preheating system including a plurality of vertically spaced-apart, inclined baffles removably disposed within a preheating enclosure secured to the furnace. A preheater bypass system is included to facilitate use of the furnace with vermiculite. Flame control and mineral waste control are preferably effectuated with a flame guide adapted to be variably positioned intermediate a lower blast nozzle and a furnace tube heat input orifice. A plurality of thermal expansion couplings and supports are utilized to compensate for thermal expansion.

38 Claims, 7 Drawing Figures

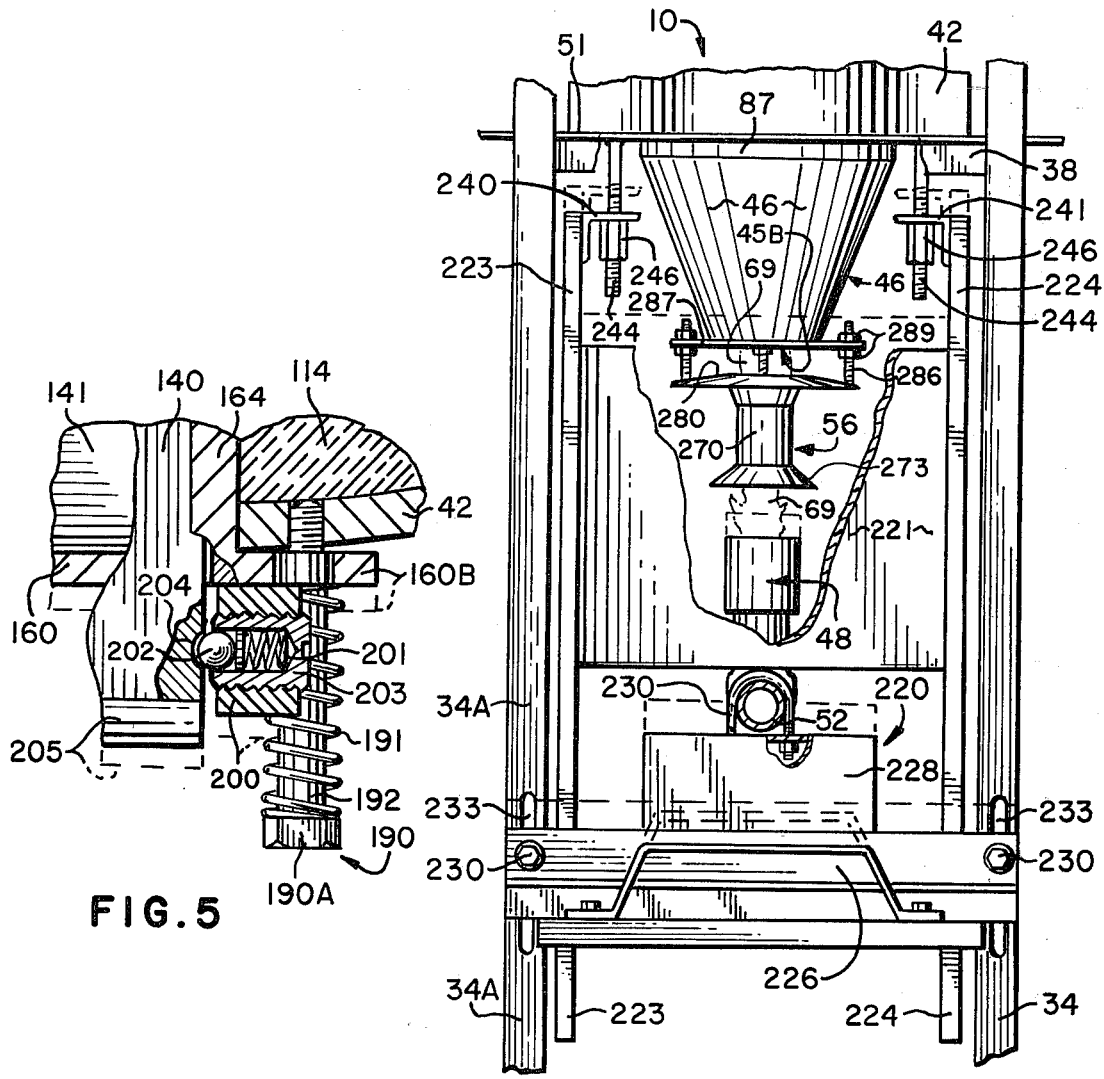

FURNACE FOR EXPANDING MINERAL ORES

BACKGROUND OF THE INVENTION

The present invention relates generally to furnaces for processing expandable ores such as vermiculite, perlite and the like. More particularly, the present invention relates to a preheater-equipped furnace adapted for use with a variety of expandable ores.

Vermiculite includes a group of hydrous silicates of various metals such as aluminum, magnesium and iron. Perlite is a siliceous, valcanic glass material primarily consisting of oxides of silicate and aluminum and combined water. These materials may be expanded through heat processing with an appropriate high temperature furnace, operating at a temperature in the order of 2500 degrees fahrenheit. When perlite, for example, is properly heat processed, it may expand up to twenty times its original volume, resulting in decreased density. In their expanded form these materials are of value as insulation products, and a variety of other well known applications are of commercial importance.

In the prior art a variety of furnaces have been proposed for heating such expandable minerals. Usually the incoming raw ore may be dropped through suitable ports providing access interiorly of a furnace tube, whereupon raw ore will drop downwardly towards an external blast nozzle. The extreme heat generated within the furnace will expand the ore, and the combination of resultant lower product density and upward directed gas pressure will propel the expanded product out from the furnace. Subsequently, the product may be conveyed to a typical cyclone separator which cools and separates the expanded ore from hot waste gases.

For energy efficiency it will be appreciated that in certain circumstances suitable preheating of incoming raw ore may be necessary. However, preheating requirements differ with various ores. For example, for efficient operation perlite should be preheated. Vermiculite generally does not require preheating.

Often preheating is accomplished in a separate rotary heater. However, separate preheating structure in fluid flow communication with a furnace input chamber has been suggested and disclosed in U.S. Pat. No. 3,097,832 issued to Murdock July 16, 1963. A preheating system involving a plurality of, vertically spaced-apart, inclined interiorly mounted baffles is shown in U.S. Pat. No. 3,311,358. In the latter device ore is dropped through a preheating chamber, dropping from one baffle plate to the next in succession. Other prior art patents broadly relevant to the present invention include U.S. Pat. Nos. 3,447,789; 3,206,905; and 2,978,339.

As will be appreciated by those skilled in the art, the frictional characteristics of raw perlite ore can result in severe wear and eventual destruction of critical furnace components. The latter factor is further aggravated by the extreme temperatures necessary for suitable processing. Normal wear and tear experienced because of friction in prior art devices usually results in periodic down time, mandating repair. Because of the high temperature at which such apparatus operates, several hours must be expended to allow the machinery to cool to permit maintenance. Thus an improved system for facilitating preheating while permitting eased maintenance and repair is mandated. Moreover, because of the wide variety of minerals ores with which such furnaces may be employed, it is imperative that, if the system is to operate economically, the equipment be adapted to be readily modified for processing ores of different types.

A further problem with prior art devices is that certain mineral impurities and heavy, unexpanded mineral elements may not expand properly during the process, and they will thus drop downwardly through the furnace tube. Resultant, potentially dangerous formations of waste material near the blast nozzle area may effect efficiency. Therefore it is desirable to provide a system wherein open flame injection may be employed at the bottom of a blast furnace tube which permits unobstructed gas flow, but results in improved control of unwanted unexpanded mineral waste.

SUMMARY OF THE INVENTION

The present invention comprises a high temperature blast furnace adapted to process expandable mineral ores such as perlite, vermiculite and the like.

The furnace preferably comprises a generally vertical, upright frame adapted to be supported by a lower concrete surface. The frame supports an elongated, tubular furnace tube which is preferably surrounded by an outer, coaxially disposed shell which defined a uniform air cooling cavity therebetween. Raw ore may be inputted to a preheating system secured to the furnace in heat exchange relation with the furnace tube, preferably within the cavity formed between the furnace tube and the outer shell.

Preferably, the preheating system includes an elongated enclosure of generally rectangular cross section having a plurality of vertically spaced apart, generally inclined baffles disposed therewithin.

The baffles are adapted to be removably coupled to the preheating enclosure within receptive guide slots formed on opposite sides of the preheating enclosure. Raw ore inputted into the preheating enclosure will drop downwardly therewithin passing from ore baffle to the next lower baffle in response to gravitational forces. The baffles will thus preheat the ore to a temperature suitable for subsequent primary heating for expansion. When minerals such as vermiculite are to be processed, the preheating system may be conveniently manually bypassed by simple adjustment of auxiliary conduit structure. In a preferred form the baffles are arranged in pairs consisting of an upper, downwardly inclined baffle terminating short of the furnace tube, and a cooperating upwardly inclined lower baffle. Incoming perlite, for example, slidably drops from the upper baffle into contact with the lower baffle without frictionally contacting the furnace tube. An orifice defined in a rear portion of the lower baffle drops the perlite ore down within the enclosure to the next pair of baffles.

Hot gases are injected by a gas nozzle located beneath the furnace tube. The furnace tube preferably includes a lower, frusto-conical section terminating in a heat input orifice. The furnace nozzle is adapted to be positioned at a variable, verically spaced-apart distance from the nozzle to effectuate desired flame control. Preferably a flame guide is secured at a selected variable position between the nozzle and the heat input orifice. The flame control includes a central tubular passageway having a lower skirted portion for guiding the flame interiorly of the passageway. An upper, generally ring-shaped downwardly tapered rejection plate is secured coaxially at the top of the flame guide. The outer diameter of the rejection plate is substantially greater than the diameter of the input orifice of the furnace tube. However, the flame guide is positioned in such a manner that heavy, unexpanded waste particles typically falling from the furnace tube abut the inclined edges of the rejection plate, and are thus prevented from falling into the flame guide passageway or the lower furnace nozzle. In this fashion waste residue is positively controlled to insure adequate and dependable internal heat distribution and material treatment, while maximizing operator safety.

Thermally induced expansion is anticipated by a variety of compensation couplings. For example, the furnace tube is supported by a circumferential, coaxial ring secured to it by a plurality of radially spaced-apart braces. The ring rests upon spaced-apart, stationary mounting struts projecting inwardly from a rigid circular mounting ring secured to the frame. A plurality of evenly spaced-apart ventilation orifices defined in the mounting ring admit cooling air into the cavity between the furnace tube and the outer shell for uniform cooling. The furnace tube output orifice preferably surrounded by a larger diameter port which is expansably coupled to the adjacent separator coupling for additional heat compensation. The port shoulder includes a plurality of radially evenly spaced apart output orifices for uniformly venting the cooling cavity.

Each preheating chamber is preferably coupled to the furnace by a spring tensioned bolt threadably received within the furnace shell. Heat expansion results in yieldable deflection of the bolt spring separate spring biased detent means are preferably employed to yieldably maintain the baffles within proper operative position, notwithstanding temperature extremes.

Therefore a broad object of this invention is to provide an efficient furnace for expanding perlite, vermiculite and the like.

A related object of the present invention is to provide a furnace of the character described with a system for preheating perlite which is characterized by reliability and ease of maintenance.

A further object of this invention is to provide a raw ore preheating furnace system for use with perlite or vermiculite in which preheating baffles may be quickly removed for replacement.

A still further object of this invention is to provide a furnace of the type described with a bypass system for routing minerals such as vermiculite around a preheating system.

Yet another object of the present invention is to provide a high temperature furnace of the type described with a plurality of thermally expansible couplings to minimize wear and tear otherwise induced by the high temperatures necessary for expanding ores.

Another important object of the present invention is to provide a system for preventing the transmission of raw ore residue or waste to the blast nozzle.

An ancillary object is to provide a furnace of the character described with an intermediate system disposed between the blast nozzle and the furnace tube input port for facilitating flame and heat control.

A related object is to adapt a furnace preheating system of the type described for easy maintenance. It is an important feature of this invention that the preheating baffle plates are readily removable from the preheating enclosures.

A similar object is to provide a furnace for expanding perlite in which the preheating time may be readily varied.

These and other objects and advantages of this invention, along with features of novelty appurtenant thereto, will appear or become apparent in the course of the following descriptive sections.

BRIEF DESCRIPTION OF THE DRAWINGS

In the appended drawings, which form a part of the specification and which are to be construed in conjunction therewith, and in which like reference numeral have been employed throughout to indicate like parts in the various views:

FIG. 5 is an enlarged, sectional view illustrating the preferred baffle plate retention system, with parts thereof broken away for clarity or ommitted for brevity;

FIG. 6 is an enlarged, isometric view of the lowermost portion of the furnace tube illustrating the blast nozzle and flame guide, with alternate positions illustrated in dashed lines, and with parts thereof broken away or shown in section for clarity; and, FIG. 7 is an enlarged, isometric view of a portion of the preheating conduit bypass system; with parts thereof broken away or shown in section for clarity.

DETAILED DESCRIPTION OF THE DRAWINGS

Figure 1:
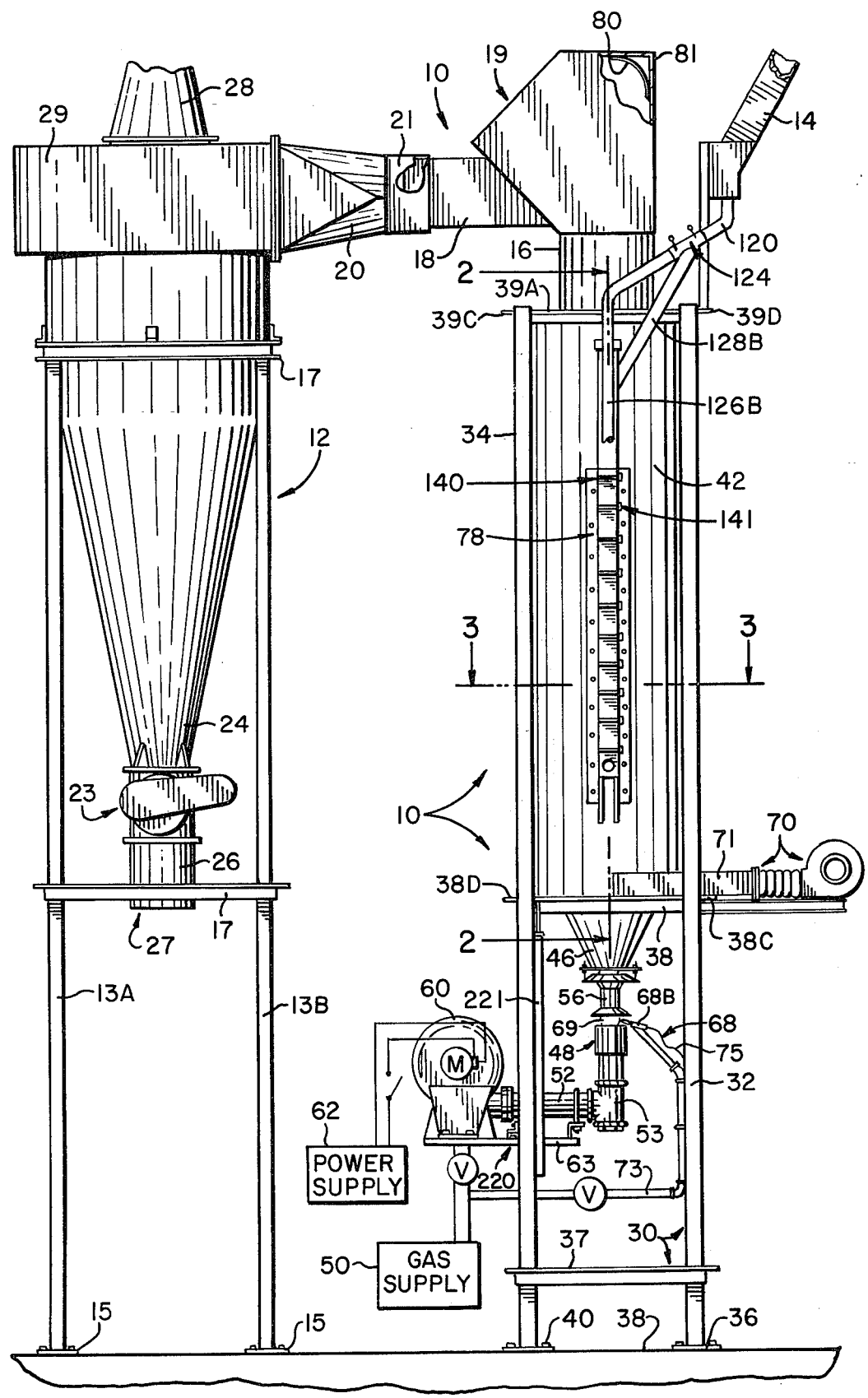
FIG. 1 is an isometric, pictorial view illustrating a furnace constructed in accordance with the teachings of the present invention, together with an associated conventional cyclone separator, with parts thereof broken away or shown in section for clarity.

With initial reference now to FIG. 1, a furnace constructed in accordance with the teachings with the present invention is generally indicated by the reference numeral 10. Furnace 10 is operationally illustrated coupled to a conventional, spaced-apart cyclone separator 12. Expandable raw ore such as vermiculite or perlite will be delivered through conventional conveying techniques into a conduit 14 for subsequent injection interiorly of the furnace 10. Minerals expanded within the furnace will rise upwardly, being outputted through a shroud 16 and duts 18, 20 for tangential input at the top of cyclone separator 12. Hot expanded ore product delivered into the separator will fall downwardly through lower frusto-conical portion 24 for delivery to a suitable container or conveying apparatus via output tube 26 and orifice 27. Waste gases are conventionally outputted through an upper exhaust 28.

Figure 4:
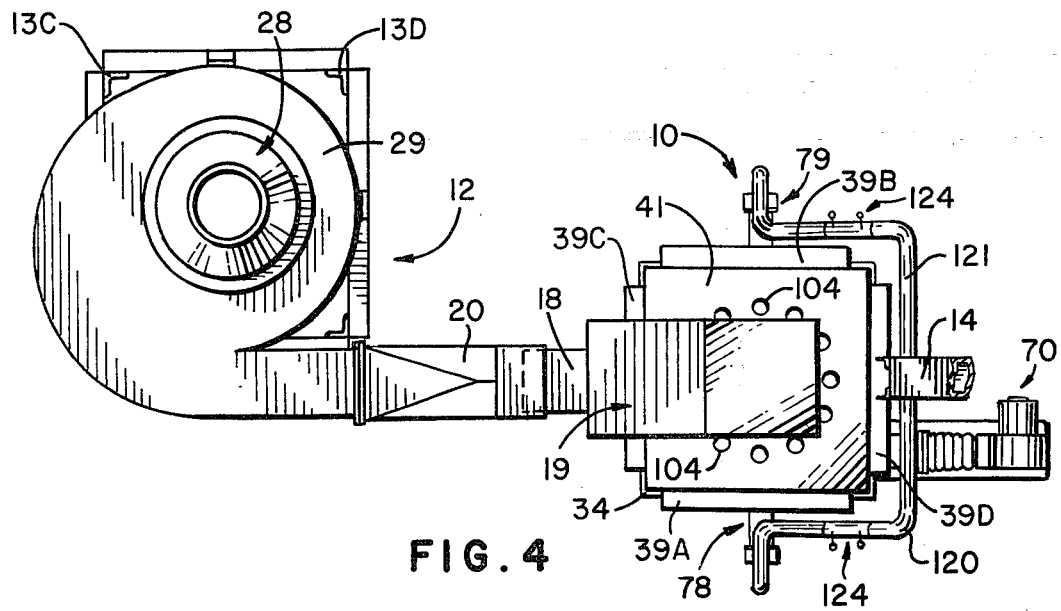
FIG. 4 is a top plan view illustrating the invention and the associated separator.

Cyclone separator 12 is supported by spaced-apart, vertically upright stanchions 13A–13D (FIGS. 1, 4) which are weldably secured to mounting plates 15 bolted to mounting surface 38, preferably of concrete. Stanchions 15A–15D are cross-braced for reinforcement purposes by spaced apart, horizontal angle iron struts 17. A conventional fan 23 draws cool air into passageway 26 to cool ore falling out of output 27 in a conventional fashion. It should be appreciated that furnace 10 has been designed to function adequately with a variety of different cyclone separator devices, and operation thereof is not limited to the cyclone separator 12.

Material outputted through the primary furnace tube output orifice 45 is directed within shroud 16, which injects the expanded perlite or vermiculite into transfer box 19. As the material rushes into box 19, a curved, baffle 80 disposed within apex 81 of the baffle chamber will encourage direction of material towards duct 18. It will be appreciated that duct 18 is telescopically received within receptive duct 21 coupled to cyclone separator input passageway 20. In this fashion the structure is inherently compensated for thermal expansion.

The furnace 10 includes a rigid, generally vertical upright frame 30 comprised of a plurality of angle iron members 32, 34, 32A, 34A which extend upwardly from lower mounting plates 36 secured to concrete mounting surface 31 by suitable bolts 40. For reinforcement purposes the frame 30 is cross-braced by a plurality of vertically spaced apart, intermediate horizontally oriented angle iron members 37, 38, 38A, 38C, 38D, and top mounted reinforcements 39A–39D. Furnace shell 42 (FIG. 3) extends vertically between lower plate 51 and upper plate 41, being weldably secured thereto.

Furnace tube 44 is positioned coaxially within shell 42, and extends downwardly through plate 51 and upwardly through top 41. Tubular output shroud 16 is of a diameter greater than output orifice 45A, whereby to facilitate clearance with furnace tube 44, notwithstanding wide temperature variations. A lowermost downwardly tapered, frusto-conical portion 46 of the furnace tube 44 is spaced-apart from furnace nozzle 48, which injects flame thereinto from gas inputted by supply 50. High pressure gas is outputted through nozzle 48 via conventional conduit 52 and elbow 53. Gas may be forced through the nozzle 48 via a conventional motor 60, controlled by an external power supply 62 and supported in proximity to the furnace via a brace 63. A conventional electric ignition and pilot system 68 is illustrated for igniting the flame 69 in a conventional fashion. Pilot gas is transmitted via conduit 73, and ignition of nozzle 68B is facilitated via electric lines 75. A tangential cooling fan assembly 70 is mounted at an elevated position and secured to frame 30 to inject air between shell 42 and furnace tube 44 in a manner which will be described in more detail later. Ore entering conduit 14 may first be preheated within preheating systems 78, 79 preferably secured on opposite sides of the furnace shell.

Figure 2:
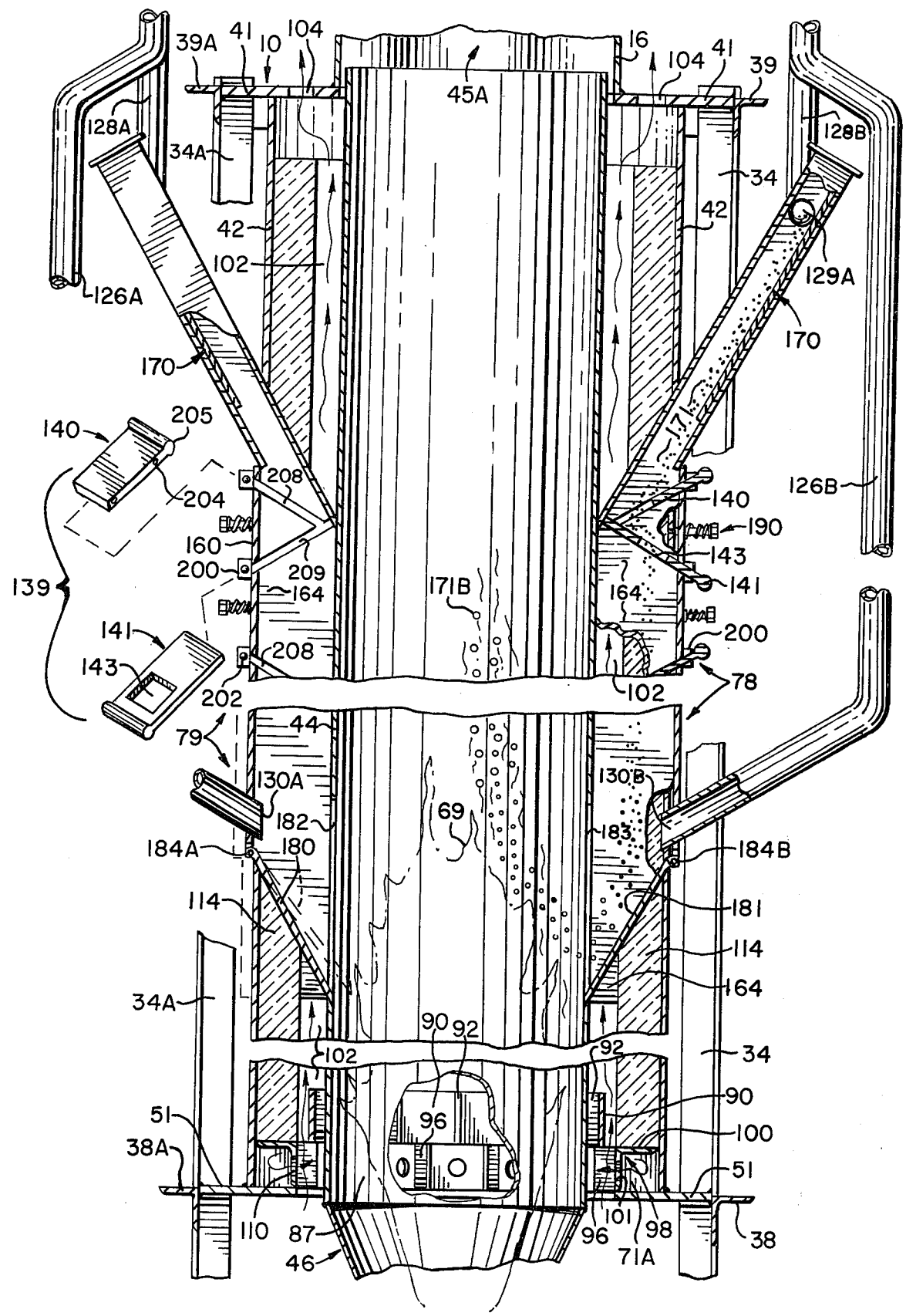
FIG. 2 is an enlarged, longitudinal sectional view of the furnace taken generally through line 2—2 in FIG. 1, with parts thereof broken away for clarity.
Figure 3:
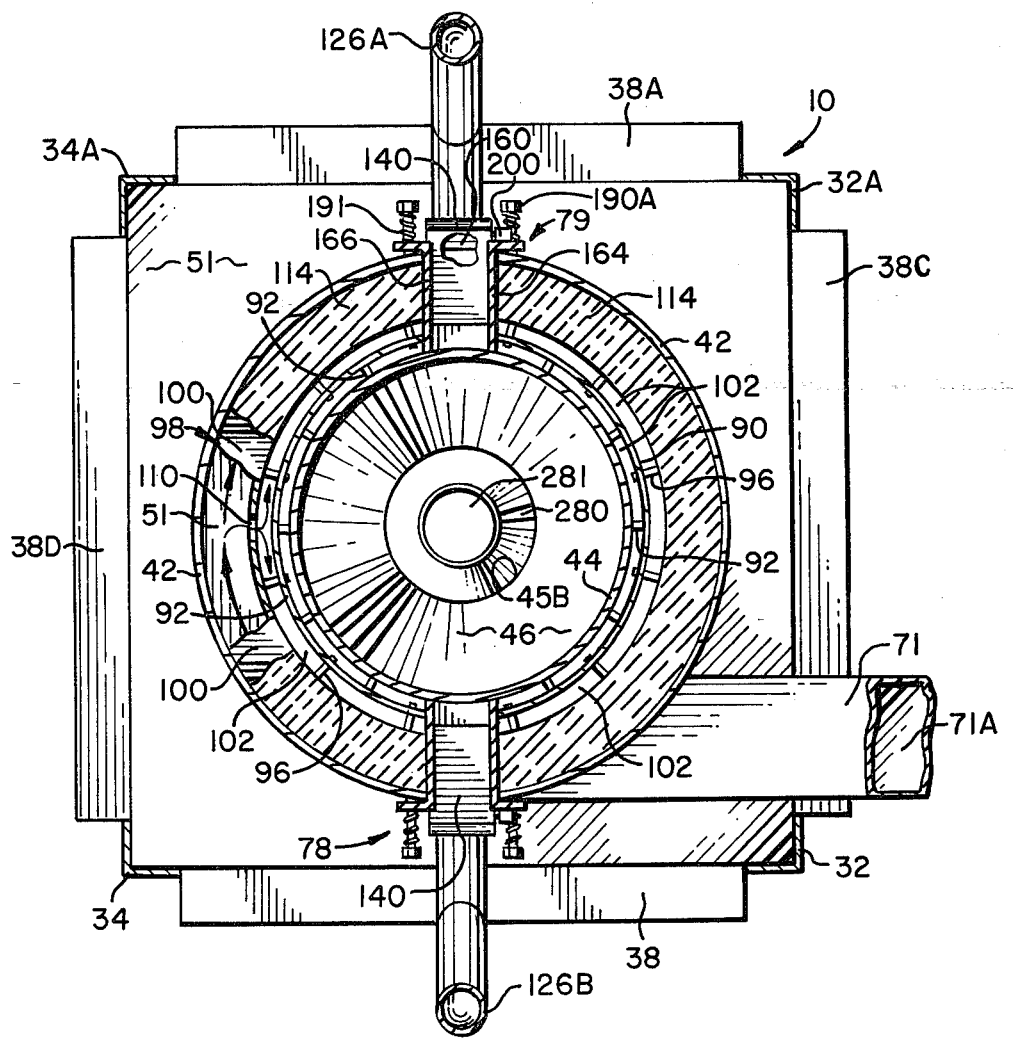
FIG. 3 is an enlarged, sectional view taken generally along line 3—3 of FIG. 1, with parts thereof broken away for clarity.

With primary reference now to FIGS. 1 through 3, the elongated furnace tube 44 is of circular cross section, and is adapted to be positioned generally vertically relative to surface 31. Tube 34 is braced intermediately along its length by contact with preheat systems 78, 79, and is supported at its lower portion 87 by a coaxially positioned, rigid mounting ring 90 which is weldably secured to tube 44 by a plurality of radially spaced-apart members 92. The lower portion 87 of tube 44 penetrates a suitable orifice provided in base plate 51, and is secured to frusto-conical, tapered portion 46. Mounting ring 90 is positioned on the tops of a plurality of radially spaced apart tabs 96 which extend radially outwardly from a circular, rigid angle iron ring 98. More particularly, circumferentionally aligned coaxially positioned iron ring 98 includes a top portion 100 and a side portion 101 secured to base plate 51. An air passageway 102 is defined between shell 42 and inner furnace tube 44. This passageway extends upwardly through the apparatus and is vented through a plurality of radially spaced-apart holes 104 formed in plate 41, which forms a shoulder relative to shroud 16. Cooling air is inputted into the device by a conventional fan 70 communicating via duct 71, and an internal passageway 71A defined interiorly of the angle iron ring 98. A plurality of radially spaced apart venting orifices 110 are defined at spaced apart locations in section 101 of mounting ring 98 to facilitate admission of cooling air at uniform intervals about the periphery of furnace tube base 87. In the preferred form of the invention a circumferential insulation ring 114 is coaxially disposed between cooling region 102 and the outermost stainless steel shroud 42. Insulation layer 114 thus promotes thermal efficiency.

Raw ore inputted via conventional input conduit 14 is divided between headers 120, 121 which respectively lead to heat exchange preheaters 78, 79. Each of the headers is coupled to a divider unit 124 (FIG. 7) which may selectively route raw ore toward either the preheaters 78, 79 or a preheater bypass conduit system 126A, 126B. Pipes 128A, 128B couple a selecting member 124 directly into a preheating assembly 78, 79 respectively. For example, raw ore 171 transmitted from selector 24 via conduit 128B enters inclined ramp 170 (FIG. 2) via orifice 129A, and drops into preheater 78, first contacting an upper baffle 140.

Bypass conduits 126A, 126B include lowermost end portions 130A, 130B respectively which deliver ore into the lowermost interior portion of the preheaters 78, 79 to bypass the baffles 140, 141 provided within the heat exchange apparatus. Ore reaching the bottoms of the preheaters will be directed against the inclined lower plates 180 or 181 through furnace tube orifices 182, 183 respectively for passage interiorly of the furnace tube and subsequent heating. In operation, it is contemplated that mineral ores such as perlite or the like will be prewarmed within the preheating assemblies. However, where it is desired to process vermiculite with the structure shown, the operator merely need manipulate the separators 124 to bypass the preheaters.

With primary reference now to FIG. 7, the separators 124 preferably provide two way selectable passage. Selector 124 includes an external sleeve member 129 adapted to telescopically receive conduits 120, 126B and which is secured thereto with conventional sheet metal screws 131. Preheater conduit 128B is angularly secured to sleeve 129, terminating in an orifice 141. A valve member 143 disposed within sleeve 129 is displaceable from a bypass position to a preheat position by proper manipulation of clevis actuators 147, 148, which communicate through slots 149 to a central axle (not shown) which drives closure valve 143. In the preheat position arcuate tab 150 (integral with valve closure member 143) prevents passage of perlite into the bypass conduit. It should be appreciated that any form of conduit selection routing system adapted to select between at least two pipes may be employed with equal utility with the present invention. Where the furnace is to be utilized only for processing perlite, the selector and preheat bypass systems may be deleted entirely by directly coupling pipes 128B and 120.

The preheating assembly 78, 79 are substantially identical in construction. Each of the preheaters comprises a generally elongated, cubicle enclosure defined between furnace tube 44, front face plate 160, and a pair of parallel, spaced-apart sidewalls 164, 166. It will be apparent that preheaters 78, 79 are disposed between the outermost shell 42 and the furnace tube 44.

The preheating systems 78, 79 receive raw ore through an inclined duct 170 which directs incoming perlite directly upon an upper downwardly inclined baffle 140. Baffle 140 terminates short of furnace tube 44, and thus it will drop perlite unto the lower, upwardly inclined baffle 141. A plurality of similar pairs 139 of such baffles are preferably vertically spaced apart within the preheating enclosure. As best viewed in FIG. 2, baffle 141 includes an aperture 143 through which perlite may drop. Thus, during preheating perlite will first slide across baffle 140 and fall upon baffle 141, prior to falling through orifice 143 unto the lower pair of baffles. As perlite continues to drop through the preheating chambers in rubbing, sequential contact with each of the spaced apart baffles, it will be preheated prior to being thrust upon one of the removable, downwardly inclined baffles 180, 181 which will direct perlite into peripheral furnace input orifices 182 or 183 respectively, defined in the sides of furnace tube 44. It will thus be apparent that as ore enters the lowermost confines of the furnace tube 44 (FIG. 2) the flame 69 will expand the raw perlite, yielding an expanded product 171B which will be blown out of orifice 45A in response to gas pressure. Where the bypass feature is selected, vermiculite, for example, will be thrust directly from bypass conduit ends 130A or 130B through inputs 182, 183 after brief contact with baffles 180 or 181.

Preheater endwall flange portions 160B overlap outer shell 42, and suitable bolts 190 secure the preheaters in operative position, being threadably received within suitable tapped orifices in the furnace shell 42. Each of the mounting bolts 190 receives a coiled spring 191, secured coaxially about shank 192 between head 190A and flange 160B. Thermal expansion of the mounting system is thus facilitated, as the preheater expands outwardly against yieldable pressure from springs 191. Lowermost preheater baffles 180, 181 are pivotally coupled to shell 42 via pins 184A, 184B to aid in installation and removal of the preheaters. Once bolts 190 are removed, for example withdrawal of the preheaters will be facilitated as baffles 180, 181 pivot to a position clearing the lower shell wall, as indicated in dashed lines in FIG. 2.

The baffles are removably secured in position by a detent mounting system (FIG. 5) including spaced apart tabs 200 which are secured to the shell 42. Each tab is tapped to threadably receive a tubular fitting 203 which internally houses a detent plunger 202 biased by a spring 201. Once the baffle is inserted between a pair of tabs 200, plunger 202 will yieldably engage a generally concave depression 204 defined on opposite sides of each baffle. Once the baffles 140 are inserted in proper operative position within spaced apart guide slots 208, they will by yieldably maintained in proper operative position upon the engagement of plunger 202 in depression 204. Each baffle may be quickly manipulated via integral handle portions 205 thereof.

With primary reference now to FIGS. 1, 3, and 6, the gas nozzle assembly 48 is operatively secured in substantial axial alignment with the furnace tube, in spaced apart relation with respect to the heat input orifice 45B. The gas system is secured to mounting carriage, generally designated by the reference numeral 220. Carriage 220 includes a frame plate 221 which rigidly extends between a pair of spaced apart stanchions 223, 224 the lowermost portions of which are weldably secured to a cross brace 226. Brace 226 supports a mounting brace 228 comprised of angle iron. Brace 228 mounts a U-clamp 230 which secures gas nozzle conduit 52 in rigid, operative alignment. The outer ends of cross brace 226 are secured via conventional bolts 230, which penetrate an elongated slot 223 provided in stanchions 34, 34A to facilitate variable verticle placement of the carriage 220. By appropriately positioning studs 230 within slots 233, it will be apparent that the gas output nozzle 48 thus be positioned in variable spaced-apart positions relative to the heat input orifices 45B.

The top portions of stanchions 223, 224 include angle iron supports 240, 241 which receive downwardly depending studs 244, which are coupled thereto via adjustable bolts 246. It will be apparent that the carriage may thus be operatively moved relative to the furnace tube by proper adjustment of bolts 246, which must of course be adjusted in cooperation with studs 230, previously discussed. In this fashion proper flame control in encouraged.

Flame guide 56 includes a generally tubular intermediate passageway 270 which terminates at its bottom in a circumferential downwardly inclined flame control skirt 273 into which flame 69 may be directed. A round, generally ring-shaped rejection plate 280 is secured in spaced relation with respect to input orifice 45B on top of tube 270. It will be apparent that the circumferential edges of rejection plate 280 are downwardly angled, and the rejection plate outer diameter is greater than the diameter of input orifice 45B. Moreover, internal orifice 281 (FIG. 3) is of a diameter smaller than orifice 45B. The flame controller 56 is secured to the lowermost conical portion 46 of the flame tube via a plurality of radially spaced apart bolts 286 which are secured within a lower flange 287 weldably secured to conical flame tube portion 46. By proper adjustment of bolts 289 the position of flame guide 56 may be moved vertical relatively to the input 45B. Proper guide position is selected such that heavy, unexpanded ore waste falling downwardly within the flame tube generate an insufficient velocity as they ride against the inclined periphery of conical portion 46 to enter orifice 281. In other words, the rejection plate 280 is preferably positioned such that waste material will accumulate on the edges of the rejection plate, ultimately dropping to a lower unobstructing position outside of either critical passageway 56 or lower gas nozzle 48. In this fashion inadvertent jamming of the apparatus is greatly discouraged. For proper flame control, a combination of adjustments, both to the position of nozzle 48, and the flame control 56, is thus facilitated. Once the flame guide is positioned to reject unexpanded ore, the nozzle 48 may then be repositioned, if necessary, to input a proper flame. Thus, the flame system may be adjusted as required to suitably process perlite, vermiculite or the like, while at the same time the flame guide may reject unwanted waste.

From the foregoing, it will be seen that this invention is one well adapted to obtain all the ends and objects herein set forth, together with other advantages which are obvious and which are inherent in the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A vertically upright furnace for processing heat expandable ore such as perlite, vermiculite or the like, the furnace comprising:
   a rigid, upright frame adapted to be disposed upon a supporting surface;
   an elongated furnace tube adapted to be supported by said frame, the furnace tube including an upper product output orifice and a lower, reduced diameter heat input orifice;
   means for preheating a raw ore and inputting preheated ore into said furnace tube for expansion, the preheating means including:
      an elongated preheating enclosure secured to said furnace in heat exchange relation with respect to said furnace tube; and,
      a plurality of heat conducting baffles for contacting and warming raw ore, the baffles adapted to be removably coupled within said enclosure in vertically spaced-apart, generally inclined relation therewithin;
   means for injecting a stream of hot gas into said furnace tube to heat and thereby expand ore therewithin; and,
   means for selectively bypassing said raw ore preheating means to permit use of said furnace with ores of varying types.

2. The combination as defined in claim 1 wherein:
   said furnace includes an elongated, generally tubular outer shell disposed coaxially about said furnace tube in spaced relation therewith for forming an air cooling cavity therebetween;
   said preheating enclosure is disposed interiorly of said air cooling cavity, an inner wall of said preheating enclosure being formed by said furnace tube and said raw ore preheating enclosure includes spaced-apart, slotted side walls adapted to slidably, removably receive said baffles.

3. The combination as defined in claim 1 wherein said heat conducting baffles are arranged in pairs vertically spaced-apart within said enclosure, each pair including:
   a lower, generally planar baffle adapted to be secured within said preheating enclosure in generally upwardly inclined relation therewithin, said lower baffle extending into substantial contact with said furnace tube, said lower baffle including a product output orifice for dropping raw ore passing over it, downwardly within said preheating enclosure toward the next lowermost baffle; and,
   an upper, generally planar baffle adapted to be secured within said preheating enclosure in downwardly inclined relation with respect to said lower baffle, said upper baffle terminating short of said furnace tube whereby raw ore passing over it is dropped downwardly upon the lower baffle without contacting the furnace tube.

4. The combination as defined in claim 2 including heat expansion compensation means for mounting said preheating enclosure to said furnace, and detent means for releasably securing said baffles to said preheating enclosure.

5. The combination as defined in claim 1 wherein said means for injecting a stream of hot gas into said furnace comprises a flame injecting gas nozzle positioned below said heat input orifice in substantial axial alignment with said furnace tube and said furnace includes a generally tubular flame guide disposed between said nozzle and said heat input orifice in substantially axial alignment with said furnace tube, the major length of said flame guide having a diameter smaller than the diameter of said heat input orifice, and a generally ring-shaped, downwardly tapered rejection plate concentrically mounted on top of the flame guide, the rejection plate having a central orifice having a diameter smaller than said furnace tube heat input orifice, the rejection plate adapted to be secured in spaced-apart relation with respect to said heat input orifice for preventing heavy, unexpanded ore waste products falling from said heat input orifice from entering said flame guide or said nozzle.

6. The combination as defined in claim 5 wherein said flame guide includes an intermediate tubular passageway and a lower flame skirt adapted to be positioned over said flame injecting nozzle for directing hot gases through said tubular passageway.

7. The combination as defined in claim 6 including adjustable means for mounting said flame injecting nozzle at a variable, spaced-apart distance from said heat input orifice.

8. The combination as defined in claim 6 including adjustable means for mounting said flame guide at variable positions between said heat input orifice and said nozzle.

9. The combination as defined in claim 8 including adjustable means for mounting said flame injecting nozzle at a variable, spaced-apart distance from said heat input orifice.

10. An upright furnace for expanding ores such as perlite, vermiculite or the like, the furnace comprising:
    a rigid frame adapted to be disposed upon a supporting surface;
    an elongated furnace tube adapted to be supported by said frame, the furnace tube including an upper product output orifice and a lower heat input portion shaped generally in the form of an inverted frustum of a cone and terminating in a reduced diameter heat input orifice;
    an elongated, generally tubular outer shell disposed coaxially about said furnace tube in spaced relation therewith and forming an air cooling cavity therebetween;
    means for inputting raw ore to be expanded into said furnace tube;
    a flame-injecting gas nozzle positioned below said heat input orifice in spaced-apart, substantially axial alignment said furnace tube;
    a generally tubular flame guide disposed between said nozzle and said heat input orifice and adapted to be axially aligned with said furnace tube, the major length of said flame guide having a diameter smaller than the diameter of said heat input orifice; and,
    a generally ring-shaped, downwardly tapered rejection plate concentrically mounted on top of the flame guide the rejection plate having an outside diameter greater than the diameter of said furnace tube heat input orifice and adapted to be secured in spaced-apart relation therewith for preventing heavy unexpanded ore waste products falling from said heat input orifice from entering said flame guide or said nozzle.

11. The combination as defined in claim 10 wherein said flame guide includes an intermediate tubular passageway and a lower flame skirt adapted to be positioned over said flame injecting nozzle for directing said hot gases through said tubular passageway.

12. The combination as defined in claim 11 including adjustable means for mounting said flame guide at variable positions between said heat input orifice and said nozzle.

13. The combination as defined in claim 12 including adjustable means for mounting said flame injecting nozzle at a variable spaced apart distance from said heat input orifice.

14. The combination as defined in claim 10 including means for preheating incoming raw ore and inputting preheated ore into said furnace tube for treatment, the preheating means including;
   an elongated enclosure secured within said cavity in heat exchange relation with said furnace tube; and,
   a plurality of heat conducting baffles for contacting and warming ore, the baffles adapted to be removably coupled to said enclosure in vertically spaced-apart, generally inclined relation within the preheating enclosure.

15. The combination as defined in claim 14 including means for selectively bypassing said raw ore preheating means to permit use of said furnace with ores of varying types.

16. The combination as defined in claim 14 wherein said heat conducting baffles are arranged in pairs vertically spaced-apart within said enclosure, each pair including:
   a lower, generally planar baffle adapted to be secured within said preheating enclosure in generally upwardly inclined relation therewithin, said lower baffle extending into substantial contact with said furnace tube, said lower baffle including a product output orifice for dropping raw ore passing over it, downwardly within said preheating enclosure toward the next lowermost baffle; and,
   an upper, generally planar baffle adapted to be secured within said preheating enclosure in downwardly inclined relation with respect to said lower baffle, said upper baffle terminating short of said furnace tube whereby raw ore passing over it is dropped downwardly upon the lower baffle without contacting the furnace tube.

17. The combination as defined in claim 14 wherein said raw ore preheating enclosure includes spaced-apart, slotted side walls adapted to slidably, removably receive said baffles.

18. The combination as defined in claim 17 including heat expansion compensation means for mounting said preheating enclosure.

19. The combination as defined in claim 18, including means for selectively bypassing said raw ore preheating means to permit use of said furnace with ores of varying types.

20. A vertically upright furnace for processing heat expandable ores such as perlite, vermiculite or the like, the furnace comprising:
   a rigid, upright frame adapted to be disposed upon a supporting surface;
   an elongated furnace tube adapted to be supported by said frame, the furnace tube including an upper product output orifice and a lower, reduced diameter heat input orifice;
   means for preheating a raw ore and inputting preheated ore into said furnace tube for expansion, the preheating means including:
      an elongated preheating enclosure secured to said furnace in heat exchange relation with respect to said furnace tube; and,
      a plurality of heat conducting baffles for contacting and warming raw ore, the baffles adapted to be removably coupled within said enclosure in vertically spaced-apart, generally inclined relation therewithin; said heat conducting baffles being arranged in pairs vertically spaced-apart within said enclosure, each pair including:
         a lower, generally planar baffle adapted to be secured within said preheating enclosure in generally upwardly inclined relation therewithin, said lower baffle extending into substantial contact with said furnace tube, said lower baffle including a product output orifice for dropping raw ore passing over it downwardly within said preheating enclosure toward the next lowermost baffle; and,
         an upper, generally planar baffle adapted to be secured within said preheating enclosure in downwardly inclined relation with respect to said lower baffle, said upper baffle terminating short of said furnace tube whereby raw ore passing over it is dropped downwardly upon the lower baffle without contacting the furnace tube; and,
   means for injecting a stream of hot gas into said furnace tube to heat and thereby expand ore therewithin.

21. The combination as defined in claim 20 including means for selectively bypassing said raw ore preheating means to permit use of said furnace with ores of varying types.

22. The combination as defined in claim 21 wherein:
   said furnace includes an elongated, generally tubular outer shell disposed coaxially about said furnace tube in spaced relation therewith for forming an air cooling cavity therebetween;
   said preheating enclosure is disposed interiorly of said air cooling cavity, and inner wall of said preheating enclosure being formed by said furnace tube, said raw ore preheating enclosure including spaced-apart, slotted side walls adapted to slidably, removably receive said baffles.

23. The combination as defined in claim 22 including heat expansion compensation means for mounting said preheating enclosure to said furnace, and detent means for releasably securing said baffles to said preheating enclosure.

24. The combination as defined in claim 23 including means for selectively bypassing said raw ore preheating means to permit use of said furnace with ores of varying types.

25. The combination as defined in claim 20 wherein said means for injecting a stream of hot gas into said furnace comprises a flame injecting gas nozzle positioned below said heat input orifice in substantial axial alignment with said furnace tube, and said furnace includes a generally tubular flame guide disposed between said nozzle and said heat input orifice in substantially axial alignment with said furnace tube, the major length of said flame guide having a diameter smaller than the diameter of said heat input orifice, the flame guide including a generally ring-shaped, downwardly tapered rejection plate concentrically mounted on top of the flame guide, the rejection plate having a central orifice having a diameter smaller than said furnace tube heat input orifice, the rejection plate adapted to be secured in spaced-apart relation with respect to said heat input orifice for preventing heavy, unexpanded ore waste products falling from said heat input orifice from entering said flame guide or said nozzle.

26. The combination as defined in claim 25 wherein said flame guide includes an intermediate tubular passageway and a lower flame skirt adapted to be positioned over said flame injecting nozzle for directing hot gases through said tubular passageway.

27. The combination as defined in claim 25 including means for selectively bypassing said raw ore preheating means to permit use of said furnace with ores of varying types.

28. A vertically upright furnace for processing heat expandable ores such as perlite, vermiculite or the like, the furnace comprising:
 a rigid, upright frame adapted to be disposed upon a supporting surface;
 an elongated furnace tube adapted to be supported by said frame, the furnace tube including an upper product output orifice and a lower, reduced diameter heat input orifice;
 means for preheating a raw ore and inputting preheated ore into said furnace tube for expansion, the preheating means including:
  an elongated preheating enclosure secured to said furnace in heat exchange relation with respect to said furnace tube; and,
  a plurality of heat conducting baffles for contacting and warming raw ore, the baffles adapted to be removably coupled within said enclosure in vertically spaced-apart, generally inclined relation therewithin;
 a generally tubular outer shell disposed coaxially about said furnace tube in spaced relation therewith for forming an air cooling cavity therebetween;
 a preheating enclosure disposed interiorly of said air cooling cavity, an inner wall of said preheating enclosure being formed by said furnace tube, and said preheating enclosure includes spaced-apart, slotted side walls adapted to slidably, removably receive said baffles; and,
 means for injecting a stream of hot gas into said furnace tube to heat and thereby expand ore therewithin.

29. The combination as defined in claim 28 wherein said heat conducting baffles are arranged in pairs vertically spaced-apart within said enclosure, each pair including:
 a lower, generally planar baffle adapted to be secured within said preheating enclosure in generally upwardly inclined relation therewithin, said lower baffle extending into substantial contact with said furnace tube, said lower baffle including a product output orifice for dropping raw ore passing over it downwardly within said preheating enclosure toward the next lowermost baffle; and,
 an upper, generally planar baffle adapted to be secured within said preheating enclosure in downwardly inclined relation with respect to said lower baffle, said upper baffle terminating short of said furnace tube whereby raw ore passing over it is dropped downwardly upon the lower baffle without contacting the furnace tube.

30. The combination as defined in claim 28 including means for selectively bypassing said raw ore preheating means to permit use of said furnace with ores of varying types.

31. The combination as defined in claim 28 including heat expansion compensation means for mounting said preheating enclosure to said furnace, and detent means for releasably securing said baffles to said preheating enclosure.

32. The combination as defined in claim 31 including means for selectively bypassing said raw ore preheating means to permit use of said furnace with ores of varying types.

33. A vertically upright furnace for processing heat expandable ores such as perlite, vermiculite or the like, the furnace comprising:
 a rigid, upright frame adapted to be disposed upon a supporting surface;
 an elongated furnace tube adapted to be supported by said frame, the furnace tube including an upper product output orifice and a lower, reduced diameter heat input orifice;
 means for preheating a raw ore and inputting preheated ore into said furnace tube for expansion, the preheating means including:
  an elongated preheating enclosure secured to said furnace in heat exchange relation with respect to said furnace tube; and,
  a plurality of heat conducting baffles for contacting and warming raw ore, the baffles adapted to be removably coupled within said enclosure in vertically spaced-apart, generally inclined relation therewithin; and,
 means for injecting a stream of hot gas into said furnace tube to heat and thereby expand ore therewithin, said means for injecting a stream of hot gas into said furnace comprising a flame injecting gas nozzle positioned below said heat input orifice in substantial axial alignment with said furnace tube, and said furnace includes a generally tubular flame guide disposed between said nozzle and said heat input orifice in substantially axial alignment with said furnace tube, the major length of said flame guide having a diameter smaller than the diameter of said heat input orifice, and the flame guide includes a generally ring-shaped, downwardly tapered rejection plate concentrically mounted on top of the flame guide, the rejection plate having a central orifice having a smaller diameter smaller than said furnace tube heat input orifice, the rejection plate adapted to be secured in spaced-apart relation with respect to said heat input orifice for preventing heavy, unexpanded ore waste products falling from said heat input orifice from entering said flame guide or said nozzle.

34. The combination as defined in claim 33 wherein said flame guide includes an intermediate tubular passageway and a lower flame skirt adapted to be positioned over said flame injecting nozzle for directing hot gases through said tubular passageway.

35. The combination as defined in claim 33 including means for selectively bypassing said raw ore preheating means to permit use of said furnace with ores of varying types.

36. The combination as defined in claim 34 wherein:
 said furnace includes an elongated, generally tubular outer shell disposed coaxially about said furnace tube in spaced relation therewith for forming an air cooling cavity therebetween;
 said preheating enclosure is disposed interiorly of said air cooling cavity, and inner wall of said preheating enclosure being formed by said furnace tube, said raw ore preheating enclosure including spaced-apart, slotted side walls adapted to slidably, removably receive said baffles.

37. The combination as defined in claim 36 including heat expansion compensation means for mounting said preheating enclosure to said furnace, and detent means for releasably securing said baffles to said preheating enclosure.

38. The combination as defined in claim 37 including means for selectively bypassing said raw ore preheating means to permit use of said furnace with ores of varying types.

* * * * *